(12) United States Patent
Reese et al.

(10) Patent No.: US 10,843,127 B2
(45) Date of Patent: Nov. 24, 2020

(54) COMPACT MEMBRANE MODULE SYSTEM FOR GAS SEPARATION

(71) Applicant: Generon IGS, Inc., Houston, TX (US)

(72) Inventors: Steven Reese, Humble, TX (US); Marc Straub, Brentwood, CA (US); John A. Jensvold, Benicia, CA (US)

(73) Assignee: Generon IGS, Inc., Houston, TX (US)

( * ) Notice: Subject to any disclaimer, the term of this patent is extended or adjusted under 35 U.S.C. 154(b) by 175 days.

(21) Appl. No.: 16/158,626

(22) Filed: Oct. 12, 2018

(65) Prior Publication Data
US 2019/0143263 A1 May 16, 2019

Related U.S. Application Data

(60) Provisional application No. 62/586,308, filed on Nov. 15, 2017.

(51) Int. Cl.
*B01D 53/22* (2006.01)
*B01D 69/02* (2006.01)
*B01D 69/12* (2006.01)
*B01D 63/04* (2006.01)
*C01B 21/00* (2006.01)

(52) U.S. Cl.
CPC .......... *B01D 53/228* (2013.01); *B01D 53/22* (2013.01); *B01D 53/226* (2013.01); *B01D 53/227* (2013.01); *B01D 63/046* (2013.01); *B01D 69/02* (2013.01); *B01D 69/125* (2013.01); *C01B 21/00* (2013.01); *B01D 2053/221* (2013.01); *B01D 2256/10* (2013.01); *B01D 2257/104* (2013.01); *B01D 2313/105* (2013.01);
(Continued)

(58) Field of Classification Search
CPC .... B01D 53/22; B01D 53/226; B01D 53/227; B01D 53/228; B01D 63/046; B01D 2313/125; B01D 2317/02; B01D 2317/04; B01D 2319/02; B01D 2319/025; B01D 2319/04; C01B 21/00
See application file for complete search history.

(56) References Cited

U.S. PATENT DOCUMENTS 4,881,953 A 11/1989 Prasad
7,497,894 B2 3/2009 Jeffers
(Continued)

FOREIGN PATENT DOCUMENTS

EP 1857166 A1 11/2007
EP 2208522 A1 7/2010
(Continued)

*Primary Examiner* — Jason M Greene
(74) *Attorney, Agent, or Firm* — William H. Eilberg

(57) ABSTRACT

A device for separating a gas, such as air, into components, includes a plurality of modules, each module having one or more polymeric membranes capable of gas separation. A set of valves, pipes, and manifolds together arrange the modules in one of two possible configurations. In a first configuration, the modules are arranged in parallel. In a second configuration, the modules are divided into two groups which are arranged in series. The device can be switched from parallel to series, or from series to parallel, simply by changing the positions of a small number of valves, typically three valves. The device can therefore produce gas either of higher purity, or moderate purity, depending on the settings of the valves.

13 Claims, 4 Drawing Sheets

(52) U.S. Cl.
 CPC .... *B01D 2313/125* (2013.01); *B01D 2319/02* (2013.01); *B01D 2319/04* (2013.01)

(56) References Cited

U.S. PATENT DOCUMENTS

| | | |
|---|---|---|
| 7,517,388 B2 | 4/2009 | Jensvold |
| 7,578,871 B2 | 8/2009 | Jensvold |
| 7,662,333 B2 | 2/2010 | Coan |
| 2003/0111402 A1* | 6/2003 | Baig .................... B01D 61/364 |
| | | 210/321.75 |
| 2007/0107596 A1* | 5/2007 | Wynn .................... B01D 53/22 |
| | | 96/4 |
| 2016/0375410 A1* | 12/2016 | Berchtold ............. B01D 53/22 |
| | | 95/55 |

FOREIGN PATENT DOCUMENTS

| | | | |
|---|---|---|---|
| EP | 2514499 A1 | 10/2012 | |
| JP | 2013-17939 | * 1/2013 | ............ B01D 53/22 |
| JP | 2013017939 A | 1/2013 | |

\* cited by examiner

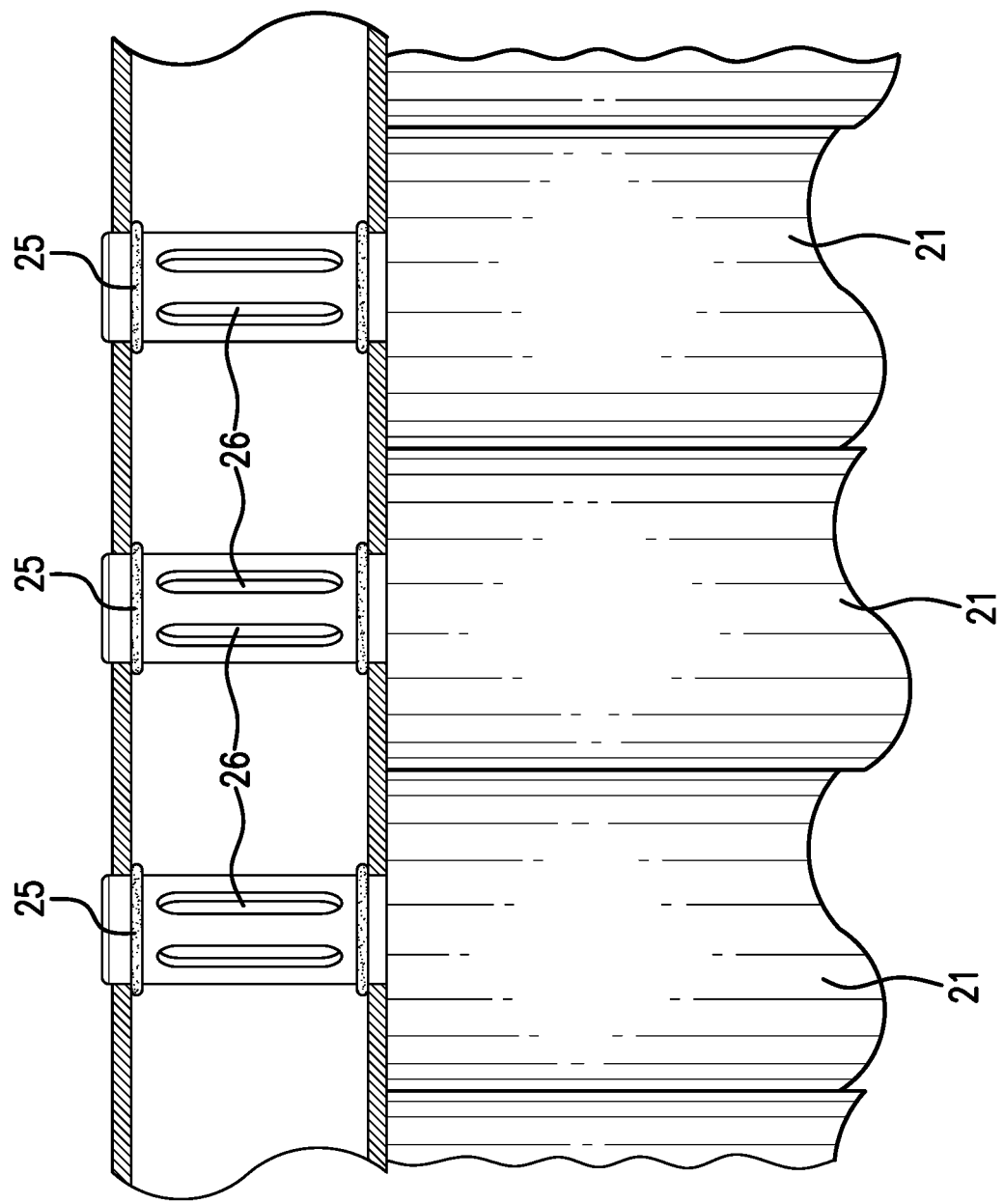

COMPACT MEMBRANE MODULE SYSTEM FOR GAS SEPARATION

CROSS-REFERENCE TO RELATED APPLICATION

Priority is claimed from U.S. provisional patent application Ser. No. 62/586,308, filed Nov. 15, 2017, the entire disclosure of which is hereby incorporated by reference.

BACKGROUND OF THE INVENTION

The present invention relates to the separation of gas into components using polymeric membranes.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

Alternatively, the gas can be introduced from the shell side of the module. In this case, the permeate is withdrawn from the bore side, and the non-permeate is taken from the shell side.

An example of a membrane-based air separation system is given in U.S. Pat. No. 4,881,953, the disclosure of which is incorporated by reference herein.

Other examples of fiber membrane modules are given in U.S. Pat. Nos. 7,497,894, 7,517,388, 7,578,871, and 7,662,333, the disclosures of which are all hereby incorporated by reference.

One application of the above-described technology is the production of nitrogen. Sometimes it is necessary to produce high purity nitrogen, defined as having a purity of up to 99.99%. In other situations, nitrogen of only moderate purity, defined as a purity of 99% or less, is needed.

In producing moderate purity nitrogen, one typically provides a plurality of membrane modules arranged in a parallel array, so that all the modules receive the same feed gas, usually compressed air, and all of the modules discharge to a common output stream. In producing high purity nitrogen, the modules are instead arranged in series, such that the first set of modules modules receives a raw feed gas, such as compressed air, and such that the product of the first set comprises the feed gas for the second set of modules. The output of the second set of modules is the high purity nitrogen stream.

The systems of the prior art can produce either moderate purity nitrogen, or high purity nitrogen, but not both. A prior art system either comprises a plurality of modules in parallel, or it comprises sets of modules arranged in series. Moreover, the series arrangement typically occupies considerably more space than does the set of parallel modules, because of the need to provide distinct stages which are separate from each other, each stage having its own housing.

The present invention provides an apparatus, disposed in a single housing, wherein the apparatus can be easily configured for series or parallel operation, simply by changing the settings of a few valves. Thus the device of the present invention provides greater flexibility of operation, and reduces the space occupied by, and the weight of, the system, while minimizing production costs associated with auxiliary piping and valves.

SUMMARY OF THE INVENTION

The present invention comprises a set of membrane modules, connected by appropriate conduits and valves, wherein the set of modules can be configured either as a plurality of modules connected in series, or as a plurality of modules connected in parallel. The configuration can be changed simply by changing the positions of a few valves. Thus, the same device can be used to produce a gas of moderate purity, or a gas of high purity, depending only on the setting of the valves.

In the preferred embodiment, a plurality of membrane modules are connected to inlet manifolds and outlet manifolds, the manifolds being connected to external pipes, the flow of gas in some of the pipes being allowed or blocked by valves installed in such pipes.

In a configuration in which the modules are all arranged in parallel, the feed gas is directed through the inlet manifolds, and conveyed simultaneously into all of the modules. The output of the modules is collected by the outlet manifolds, which convey the product gas through an external pipe to an outlet port.

In a configuration in which the modules are effectively arranged in series, the feed gas is directed, due to the setting of the external valves, into only some, preferably half, of the modules in the set. The product gas of these modules is directed, again due to the setting of the valves, back to inlet manifolds connected to the modules which did not receive the initial flow of gas. The product gas from this second group of modules is then collected by outlet manifolds, and conveyed through an external pipe to the outlet port.

Thus, in the latter configuration, although the modules occupy the same physical space, and are not moved, they function either as one larger set of modules connected in parallel, or two smaller sets of modules arranged in series, based only upon the change of the positions of the valves. In switching between series and parallel modes, one does not move the modules, and one does not make any changes other than to change the positions of the valves.

The present invention therefore saves substantial space and weight, by using a single group of modules, contained in a single housing, for both parallel and series operation.

The present invention therefore has the primary object of providing a set of modules which can be configured in a series or parallel configuration, simply by changing the positions of a small number of valves.

The invention has the further object of reducing the volume occupied by a membrane module system, while maintaining the flexibility of the system to operate in either a series or parallel mode.

The invention has the further object of providing a membrane-based gas-separation system which can be easily configured to provide either a moderate purity product gas, or a high purity product gas, simply by changing the positions of a small number of valves.

The invention has the further object of reducing the weight of a membrane-based gas-separation system.

The invention has the further object of reducing the cost of acquisition and operation of a membrane-based gas-separation system.

The invention has the further object of facilitating the production of either moderate purity nitrogen, or high purity nitrogen, using a set of gas-separation membrane modules contained in a single housing.

The reader skilled in the art will recognize other objects and advantages of the present invention, from a reading of the following brief description of the drawings, and the detailed description of the invention.

BRIEF DESCRIPTION OF THE DRAWINGS

FIG. 4 provides a detail of the construction of the device of the present invention, showing the connection of the membrane modules to a manifold.

DETAILED DESCRIPTION OF THE INVENTION

The present invention comprises an apparatus having a plurality of membrane modules, wherein the apparatus has a first configuration in which the modules are all operated in parallel, and a second configuration in which the modules comprise two groups which are effectively arranged in series. The configuration of the apparatus can be changed simply by changing the position of a small number of valves, typically three valves.

The parallel configuration is used to produce a gas having moderate purity, and the series configuration is used to produce a gas having high purity.

In brief, when the system is operated in the parallel mode, the feed gas is distributed among all of the modules, and passes through the modules simultaneously. When the system is operated in the series mode, the feed gas is directed into some, but not all, of the modules, and the product of said modules is then directed into some or all of the remaining modules, i.e. those modules that did not receive the initial feed gas.

The following description of the invention will use, as an example, the case wherein the gas being separated is air, and wherein the product gas is nitrogen, which is recovered as a retentate stream. However, the invention can be practiced with other gases, and could be implemented such that the product gas is the permeate and not the retentate, without departing from the spirit of the invention.

Figure 1:
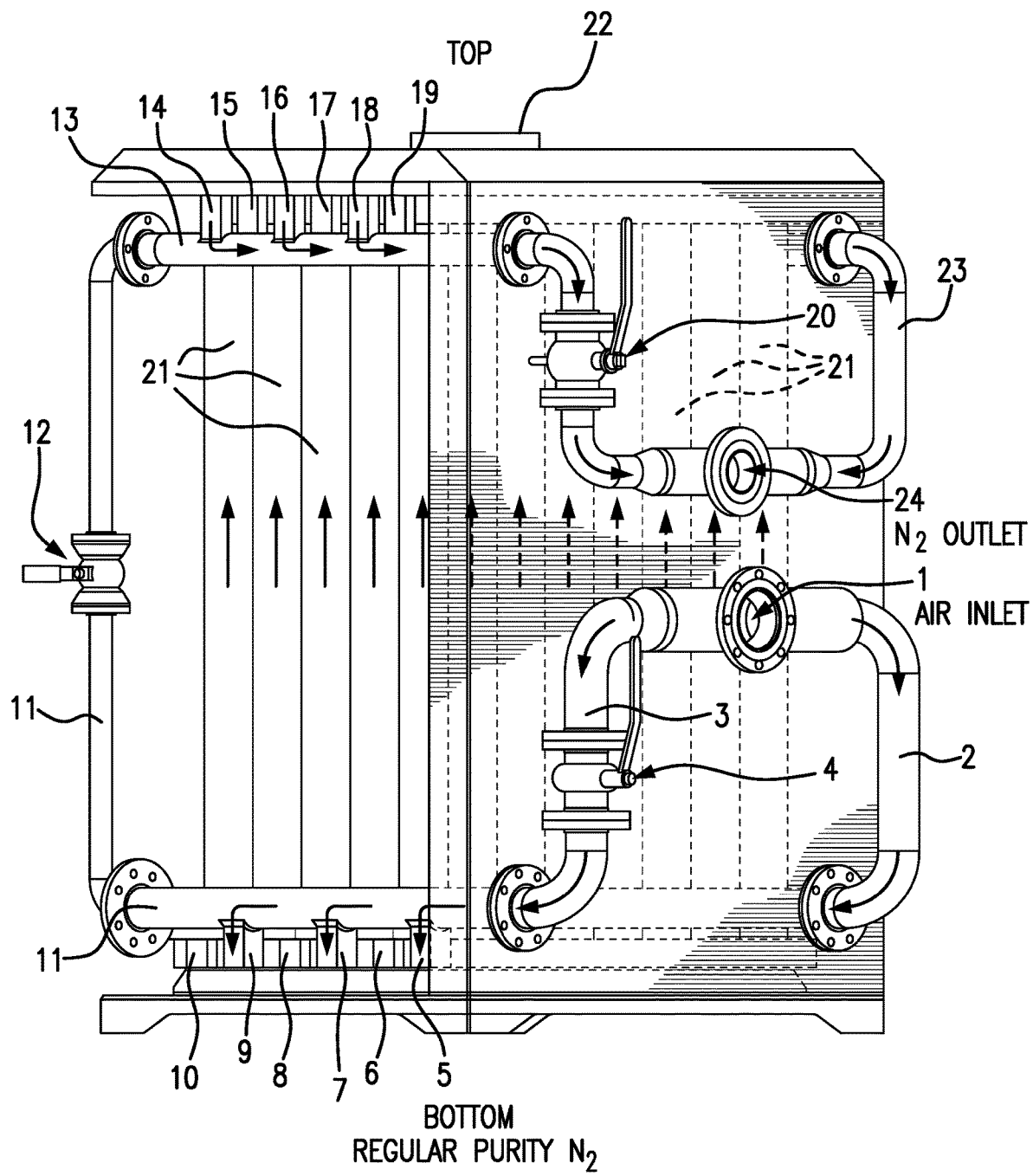
FIG. 1 provides an elevational view of a set of membrane modules, made according to the present invention, having valves and piping set to configure the device for production of nitrogen of moderate purity.

FIG. 1 shows the apparatus of the present invention, in the configuration wherein all of the modules are arranged in parallel. The modules 21 are arranged in a plurality of rows. In the embodiment shown, there are six rows, each row containing six modules. Other arrangements could be used instead, within the scope of the invention. The internal structure of the modules does not form part of the present invention; the modules can be made according to the prior art cited above, or in other ways.

The three control valves are valves 4, 12, and 20. In the drawings, when a valve handle is generally parallel to its associated conduit, the valve is open, and gas can flow through the conduit. When the valve handle is generally perpendicular to the conduit, the valve is closed, and no gas can flow through the conduit.

Air to be separated enters air inlet 1, communicating with pipes 2, 3 and 11 which are external to the set of modules 21. Another pipe, corresponding to pipe 11, is located on the side of the set of modules which is not visible in the figure. But it is understood that such pipe is connected to pipe 2. The pipes 2 and 11 convey air to manifolds 5, 6, 7, 8, 9, and 10, which manifolds are located at the bottom of the various modules 21.

The manifolds 5-10 are staggered, such that pipe 2 conveys gas (air) to manifolds 6, 8, and 10, and pipe 11 conveys gas to manifolds 5, 7, and 9. Although the connection between pipe 2 and manifolds 6, 8, and 10 is in a region that is obscured in the view of FIG. 1, the fluid connection is essentially the same as the connection between pipe 11 and manifolds 5, 7, and 9.

The modules are arranged in a series of rows, and each row can have any number of modules sharing the same inlet row manifold. In the example given in FIGS. 1 and 2, and in the top view of FIG. 3, there are six modules in each row.

The product (retentate) gas produced by the modules flows into manifolds 14, 15, 16, 17, 18, and 19, located at the top of the set of modules in FIG. 1. These manifolds are also staggered, similar to the manifolds at the bottom of the set of modules. Thus, manifolds 14, 16, and 18 collect the outlet gas from the modules, for their respective rows, and discharge the gas into pipe 13. Manifolds 15, 17, and 19 discharge into pipe 30, on the opposite side of the set of modules, pipe 30 not being visible in FIG. 1, but being visible in the top view of FIG. 3. Pipe 30 connects to pipe 23, as shown in FIG. 3.

More particularly, modules in the row connected with inlet row manifold 5 discharge into outlet manifold 19. Modules connected with inlet row manifold 6 discharge into outlet manifold 18. Modules connected with inlet row manifold 7 discharge into outlet manifold 17. Modules connected with inlet row manifold 7 discharge into outlet manifold 17. Modules connected with inlet row manifold 8 discharge into outlet manifold 16. Modules connected with inlet row manifold 9 discharge into outlet manifold 15. And modules connected with inlet row manifold 10 discharge into outlet manifold 14.

Figure 3:
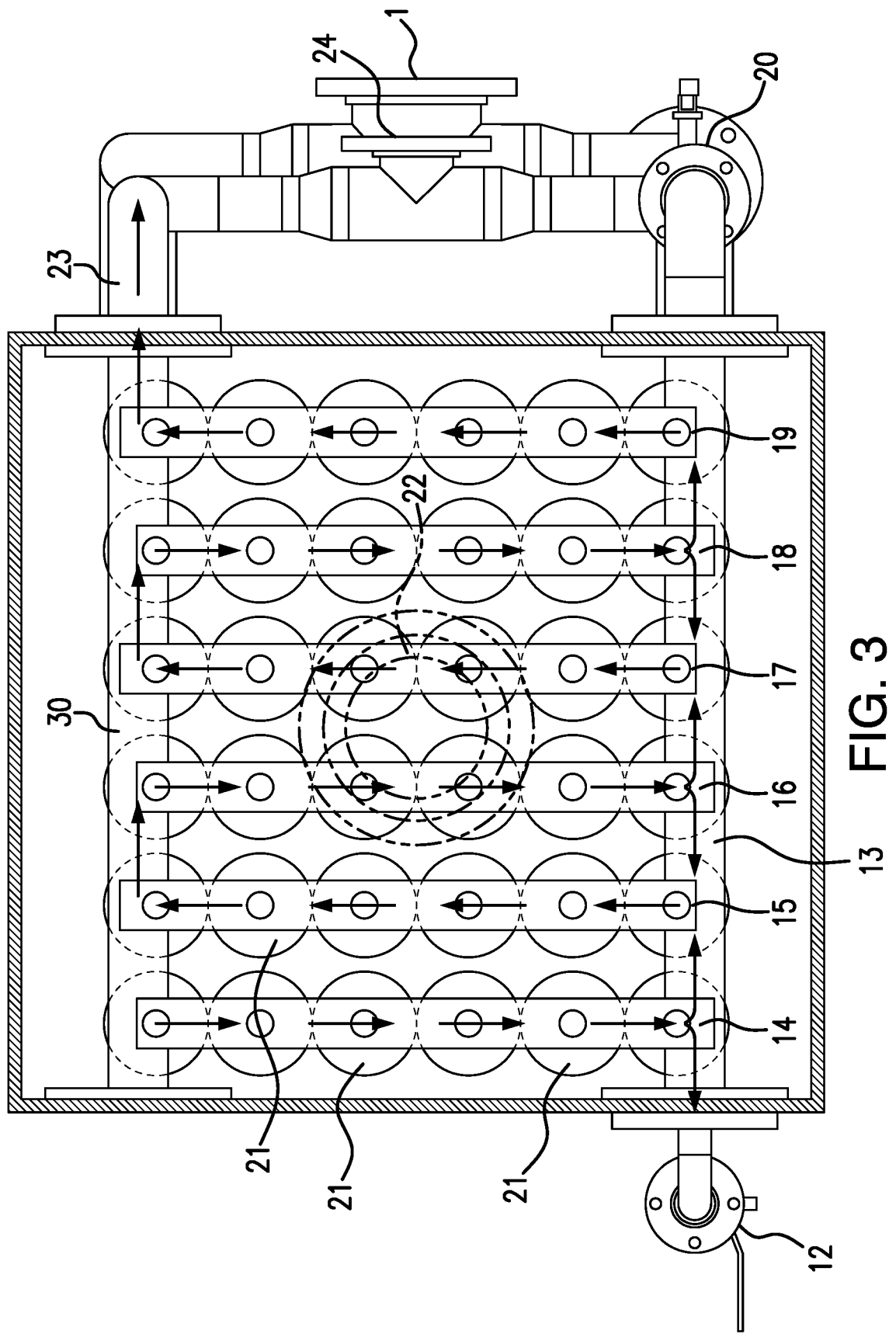
FIG. 3 provides a top view, partly broken away, of the device of FIGS. 1 and 2.

Outlet manifolds 14, 16, and 18 discharge into pipe 13, while outlet manifolds 15, 17, and 19 discharge into pipe 30, visible in FIG. 3, which is fluidly connected to pipe 23. Pipe 23 connects with the nitrogen outlet port 24 in all configurations. Pipe 13 collects gas that can either be directed to port 24 or released through valve 12 to enter pipe 11, depending on the positions of the valves, as will be shown later.

The individual modules take in feed gas, which is air in the present example. The modules produce a permeate stream which is oxygen-rich, relative to the feed stream, at low pressure. The permeate stream flows into the spaces around the modules, and this permeate gas is vented through port 22 at the top of the system. Fans (not shown) may be used at or near port 22 to facilitate the removal of the permeate gas. The non-permeate gas, i.e. the gas which does not pass through the membranes, is the retentate stream, which in the present example is the product gas, a nitrogen-enriched stream. The retentate is discharged into the upper outlet row manifolds.

In the configuration represented in FIG. 1, valve 4 is open, so gas (air) can flow freely, through pipes 2 and 3, to all of the bottom manifolds 5-10, and such gas passes upward through all of the modules, as indicated by the arrows. Gas cannot flow beyond pipe 11, because valve 12 is closed.

Because valve 20 is open, and valve 12 is closed, gas in pipe 13 is forced to flow to the nitrogen outlet 24. Similarly, gas in pipe 30, visible only in FIG. 3, on the opposite side of the set of modules, must flow into pipe 23, and then to the nitrogen outlet 24. Waste gas, which in this example is permeate oxygen, exits the system at vent 22.

One can therefore see that in the configuration of FIG. 1, all of the modules are effectively arranged and operated in parallel. That is, the incoming air is directed to all of the modules, and divided among those modules. The product gases of the modules are collected at the top section, and together comprise an output stream. In the example of air separation, this output stream is nitrogen of moderate purity.

Figure 2:
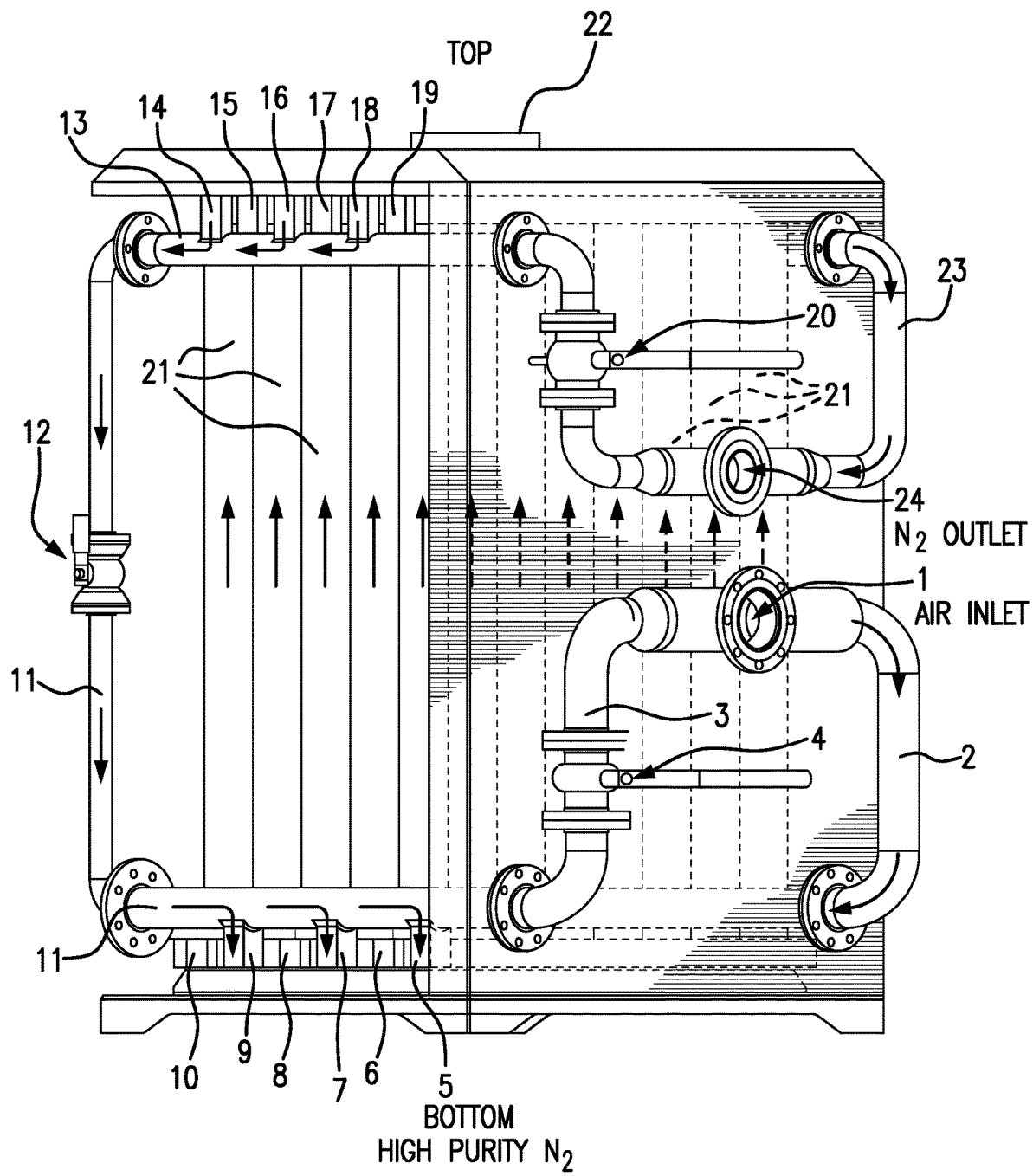
FIG. 2 provides an elevational view of the device of FIG. 1, but in which the valves are set to configure the device for production of nitrogen of high purity.

FIG. 2 illustrates the configuration wherein there are effectively two groups of modules operating in series. Note that, in FIG. 2, the positions of the three valves have been changed. That is, valve 4 is now closed, valve 12 is now open, and valve 20 is now closed.

Air enters through air inlet 1. But because valve 4 is closed, no air from the inlet 1 can flow into pipe 11. Instead, all the air from the inlet flows through pipe 2, into the pipe corresponding to pipe 11 (not visible in the figure), on the far side of the set of modules, and into manifolds 6, 8, and 10. The air therefore flows into every other module, i.e. only those modules which are connected to manifolds 6, 8, and 10. Thus, in this arrangement, the air initially flows into approximately one-half of the modules, and is prevented from entering the remaining modules.

The product gas (the retentate nitrogen-enriched stream), from the modules which received the initial air stream, flows into manifolds 14, 16, and 18, which connect to pipe 13. Because valve 20 is closed and valve 12 is open, this stream flows downward, as shown in FIG. 2, through pipe 11, and then into manifolds 5, 7, and 9. The latter manifolds are in fluid connection with the modules which did not receive the original feed stream. The gas then flows upward through these modules. Because the gas entering these modules, as an input stream, is already nitrogen-enriched, the product retentate gas will be nitrogen of even higher purity. The output of these modules flows out through outlet row manifolds 15, 17, and 19, and then flows into pipe 30 (visible only in FIG. 3) and pipe 23, and to nitrogen outlet 24. The waste gas (permeate) exits through vent 22. The output retentate gas is therefore nitrogen of high purity.

Thus, in the arrangement of FIG. 2, the modules are effectively divided into two groups having approximately equal numbers of modules, and the feed gas is conveyed first through one group of modules, and the product gas so produced is then conveyed through the other group of modules. Thus, the two groups of modules are effectively arranged in series, even though they are physically disposed within the same housing, and even though they are interleaved with each other.

Each row of modules, defined by its shared inlet row manifold, and its outlet row manifold, is associated with one of two top exterior discharge pipes 13 or 23, for the output (retentate) flow of that row. For maximum efficiency, and to allow for the best configuration and minimal piping, rows that connect through manifold 11 (inlet row manifolds 5, 7, 9) connect to pipe 30, which connects to external discharge pipe 23, while rows that connect through pipe 2 to inlet row manifolds 6, 8, 10 ultimately discharge into external pipe 13. The routing of process flows in this way facilitates the use of valves 12, 20, and 4 to switch from a parallel configuration to a series configuration.

While not absolutely necessary for its operation, it is best to alternate rows, with regard to connection to the various external pipes 2, 11, 13, 23, to simplify the manufacture. This arrangement maximizes the distance between piping lines from these external conduits, to the various inlet/outlet row manifolds, so that welded or screw attachments can be easily constructed with adequate spacing, while allowing the rows of modules to be closely packed together.

The permeate stream from each module in the system simply vents into the system enclosure (not shown), and out through the top port 22, with the aid of a vent fan. The enclosure must also allow for a compressed air port and a retentate port exiting the enclosure. The enclosure protects the system from the environment and allows for the permeate stream from the modules to be controlled at the top vent.

In summary, it is apparent that the plurality of valves, pipes, manifolds and ports together comprise means for arranging the set of modules in one of two configurations, namely a first configuration in which the modules are effectively configured in parallel, and a second configuration in which the modules are divided into two groups configured in series.

The valving to switch the system from operating in parallel to operating in series will ideally be in the enclosure, but the control handles can be positioned outside the enclosure to facilitate the switching between parallel and series configurations.

FIG. 4 shows the connection between the modules 21 and the inlet or outlet row manifolds. Inlet and outlet piping from the modules enter the row manifolds through O-ringed ports 25. The inlet and outlet piping from the modules has slots 26 that allow passage of gas into or out of the module. This allows for simple assembly of modules for the compact arrangement.

In an alternative embodiment, one may substitute the set of three two-way valves used to control the flow pattern in the system to one three-way valve and one two-way valve. This arrangement would require the use of a three-way valve in place of either valves 12 and 4, or to replace the combination of valves 12 and 20. Depending on this choice, either valve 4 or valve 20 would remain as a two-way valve. This alternative would change the piping layouts as shown in the figures.

The invention can be modified in other ways, without departing from the basic concept. For example, one could arrange the modules in groups having unequal numbers. The sets of modules could be interleaved, as shown in the examples described above, or non-interleaved, or one could provide some other pattern of interleaving and non-interleaving.

In the embodiment wherein two groups of modules are effectively connected in series, the numbers of modules in each group, in the example discussed above, were equal, or nearly equal. But in practice, these numbers of modules in each group could be different, i.e. the set of modules need not be divided exactly in half. These and other modifications will be apparent to those skilled in the art, and should be considered within the spirit and scope of the following claims.

What is claimed is:

1. Apparatus for non-cryogenic separation of gases, comprising a plurality of modules, each module including at least one polymeric membrane capable of separating components of a gas passing through the module, the apparatus including a plurality of conduits and valves which are connected to the modules,
wherein the modules are arranged in a plurality of rows, each row including a plurality of modules, the apparatus further comprising a feed gas conduit, the feed gas conduit being connected to an inlet manifold which establishes a fluid connection between the feed gas conduit and some of the modules, wherein the inlet manifold directs gas into every other row of modules,
wherein, in a first configuration of the valves, a feed gas is directed into all of the modules, wherein the modules are connected in parallel, and
wherein, in a second configuration of the valves, a feed gas is directed into a first group of modules, the first group comprising fewer than all of the modules, and then into a second group of modules, the second group comprising modules not belonging to the first group, wherein the first and second groups of modules are effectively connected in series.

2. The apparatus of claim 1, wherein there are three valves, each valve having two positions, one position being an open position and a second position being a closed position.

3. The apparatus of claim 1, further comprising an output gas conduit, the output gas conduit being connected to an outlet manifold which establishes a fluid connection between an output gas produced by the modules and the output gas conduit.

4. The apparatus of claim 3, wherein the outlet manifold directs gas out of every other row of modules.

5. The apparatus of claim 1, wherein the first and second groups of modules contain a same number of modules.

6. Apparatus for non-cryogenic separation of a gas into components, comprising:
a) a plurality of modules, each module including at least one polymeric membrane capable of separating components of a gas passing through the module, and
b) means for arranging said plurality of modules in one of two configurations, wherein in a first configuration, a feed gas passes through a plurality of modules arranged in parallel, and wherein in a second configuration, a feed gas passes first through a first group of modules and then through a second group of modules, the second group being distinct from the first group, wherein in the second configuration, the first and second groups of modules are effectively arranged in series,
wherein modules of the first group are interleaved with modules of the second group.

7. The apparatus of claim 6, wherein the first and second groups of modules contain a same number of modules.

8. The apparatus of claim 6, wherein the first and second groups of modules together comprise all of the modules of the apparatus.

9. A method for selecting a degree of purity of a separated gas component, the component being separated from a feed gas, the method including providing a plurality of modules, each module including at least one polymeric membrane capable of separating components of a gas passing through the module, the apparatus including a plurality of conduits and valves which are connected to the modules,
wherein, in a first configuration of the valves, a feed gas is directed into all of the modules, wherein the modules are connected in parallel, and
wherein, in a second configuration of the valves, a feed gas is directed into a first group of modules, the first group comprising fewer than all of the modules, and then into a second group of modules, the second group comprising all modules not belonging to the first group, wherein the modules of the first group are interleaved with the modules of the second group, wherein the first and second groups of modules are effectively connected in series,
the method comprising placing the valves in the first position when a product of moderate purity is desired, and placing the valves in the second position when a product of higher purity is desired.

10. The method of claim 9, wherein there are three valves, each valve having two positions, one position being an open position and a second position being a closed position, and wherein the placing steps comprise adjusting positions of the three valves.

11. The apparatus of claim 1, wherein at least one module is connected to a conduit having slots, the slots defining a passage for gas flowing between the module and the inlet manifold.

12. Apparatus for non-cryogenic separation of gases, comprising a plurality of modules, each module including at least one polymeric membrane capable of separating components of a gas passing through the module, the apparatus including a plurality of conduits and valves which are connected to the modules,
wherein the modules are arranged in a plurality of rows, each row including a plurality of modules, the apparatus further comprising a feed gas conduit, the feed gas conduit being connected to an inlet manifold which establishes a fluid connection between the feed gas conduit and some of the modules,
wherein, in a first configuration of the valves, a feed gas is directed into all of the modules, wherein the modules are connected in parallel, and
wherein, in a second configuration of the valves, a feed gas is directed into a first group of modules, the first group comprising fewer than all of the modules, and then into a second group of modules, the second group comprising modules not belonging to the first group, wherein the first and second groups of modules are effectively connected in series,
wherein at least one module is connected to a conduit having slots and an O-ringed port, the slots being generally perpendicular to a direction of fluid flow in the manifold, the slots defining a passage for gas flowing between the module and the inlet manifold.

13. Apparatus for non-cryogenic separation of a gas into components, comprising:
   a) a plurality of modules, each module including at least one polymeric membrane capable of separating components of a gas passing through the module, wherein the modules are arranged in a plurality of rows, each row including a plurality of modules, the apparatus further comprising a feed gas conduit, the feed gas conduit being connected to an inlet manifold which establishes a fluid connection between the feed gas conduit and some of the modules,
   b) means for arranging said plurality of modules in one of two configurations, wherein in a first configuration, a feed gas passes through a plurality of modules arranged in parallel, and wherein in a second configuration, a feed gas passes first through a first group of modules and then through a second group of modules, the second group being distinct from the first group, wherein in the second configuration, the first and second groups of modules are effectively arranged in series,
   wherein at least one module is connected to a conduit having slots and an O-ringed port, the slots being generally perpendicular to a direction of fluid flow in the manifold, the slots defining a passage for gas flowing between the module and the inlet manifold.

* * * * *